(12) United States Patent
Dekker et al.

(10) Patent No.: US 11,979,714 B2
(45) Date of Patent: May 7, 2024

(54) OPTICAL TRANSDUCER AND METHOD FOR MEASURING DISPLACEMENT

(71) Applicant: ams International AG, Jona (CH)

(72) Inventors: Ronald Dekker, Jona (CH); Rene Heideman, Jona (CH); Arne Leinse, Jona (CH); Catalin Lazar, Jona (CH); Laurent Nevou, Jona (CH); Colin Steele, Jona (CH); Anderson Pires Singulani, Jona (CH); Goran Stojanovic, Jona (CH); Simon Mueller, Jona (CH)

(73) Assignee: AMS INTERNATIONAL AG, Jona (CH)

( * ) Notice: Subject to any disclaimer, the term of this patent is extended or adjusted under 35 U.S.C. 154(b) by 267 days.

(21) Appl. No.: 17/612,719

(22) PCT Filed: Apr. 2, 2020

(86) PCT No.: PCT/EP2020/059392
§ 371 (c)(1),
(2) Date: Nov. 19, 2021

(87) PCT Pub. No.: WO2020/233882
PCT Pub. Date: Nov. 26, 2020

(65) Prior Publication Data
US 2022/0240023 A1 Jul. 28, 2022

(30) Foreign Application Priority Data
May 22, 2019 (EP) .................................... 19175935

(51) Int. Cl.
*H04R 23/00* (2006.01)
*G01L 9/00* (2006.01)
(Continued)

(52) U.S. Cl.
CPC .......... *H04R 23/008* (2013.01); *G01L 9/0077* (2013.01); *G02B 6/4214* (2013.01);
(Continued)

(58) Field of Classification Search
CPC ........ H04R 7/04; H04R 19/04; H04R 23/008; H04R 29/004; G01L 9/0076;
(Continued)

(56) References Cited

U.S. PATENT DOCUMENTS 4,865,453 A * 9/1989 Gidon ................ G01D 5/35303
356/482
4,868,803 A * 9/1989 Sunagawa ......... G11B 11/10576
(Continued)

FOREIGN PATENT DOCUMENTS

WO 200212865 A1 2/2002

OTHER PUBLICATIONS

Bicen, "Micromachined Diffraction Based Optical Microphones and Intensity Probes With Electrostatic Force Feedback", Georgia Institute of Technology, Aug. 2010, 184 pages.
(Continued)

*Primary Examiner* — Thang V Tran
(74) *Attorney, Agent, or Firm* — MH2 TECHNOLOGY LAW GROUP LLP (57) ABSTRACT

An integrated optical transducer for measuring displacement of a diaphragm comprises the diaphragm, a lens element and a substrate body having a waveguide structure and a coupling element. The diaphragm is arranged distant from the substrate body and substantially parallel to a main extension plane of the substrate body. The waveguide structure is configured to guide light from a light source to the coupling element and from the coupling element to a photodetector. The coupling element is configured to couple at least part of the light in the waveguide structure onto a light path between
(Continued)

the coupling element and the diaphragm and to couple light reflected by a surface of the diaphragm from the light path into the waveguide structure. The lens element is arranged on the light path such that light on the light path passes through the lens element.

18 Claims, 3 Drawing Sheets

(51) Int. Cl.
    *G02B 6/42*     (2006.01)
    *G02B 27/30*     (2006.01)
    *H04R 7/04*     (2006.01)
    *H04R 19/04*     (2006.01)
    *H04R 29/00*     (2006.01)

(52) U.S. Cl.
    CPC ............... *G02B 27/30* (2013.01); *H04R 7/04* (2013.01); *H04R 19/04* (2013.01); *H04R 29/004* (2013.01); *H04R 2201/003* (2013.01)

(58) Field of Classification Search
    CPC ... G01L 9/0077; G01L 9/0016; G01L 9/0017; G01L 9/0041; G02B 6/4214; G02B 27/30; G11B 7/0956
    See application file for complete search history.

(56) References Cited

U.S. PATENT DOCUMENTS

| | | | | |
|---|---|---|---|---|
| 5,262,884 | A | * | 11/1993 | Buchholz ............... H04B 10/11 381/172 |
| 5,262,885 | A | | 11/1993 | Steers et al. |
| 5,835,472 | A | * | 11/1998 | Horie ..................... G11B 7/124 369/112.17 |
| 6,014,239 | A | | 1/2000 | Veligdan |
| 6,055,080 | A | | 4/2000 | Furstenau et al. |
| 6,542,244 | B1 | | 4/2003 | Rumpf et al. |
| 6,567,572 | B2 | | 5/2003 | Degertekin et al. |
| 7,134,179 | B2 | | 11/2006 | Freeman et al. |
| 7,187,453 | B2 | * | 3/2007 | Belleville ............... G01J 3/0256 356/519 |
| 7,277,642 | B2 | * | 10/2007 | Shinzou ................... G01H 9/00 398/132 |
| 8,503,701 | B2 | * | 8/2013 | Miles ..................... H04R 23/008 356/900 |
| 9,274,283 | B1 | | 3/2016 | Ellis-Monaghan et al. |
| 9,479,875 | B2 | | 10/2016 | Hall et al. |
| 9,503,820 | B2 | | 11/2016 | Hall et al. |
| 2002/0039463 | A1 | * | 4/2002 | Degertekin ........ G02B 27/4255 385/12 |
| 2002/0114477 | A1 | * | 8/2002 | Paritsky ............... H04R 23/008 381/172 |
| 2003/0016838 | A1 | * | 1/2003 | Paritsky ............... H04R 23/008 381/172 |
| 2003/0128958 | A1 | | 7/2003 | Paritsky et al. |
| 2004/0099799 | A1 | | 5/2004 | Shinzou |
| 2004/0202418 | A1 | | 10/2004 | Ghiron et al. |
| 2006/0043268 | A1 | | 3/2006 | Abrate et al. |
| 2016/0041096 | A1 | | 2/2016 | Tiefenthaler |
| 2017/0328702 | A1 | | 11/2017 | Vossough et al. |
| 2019/0047848 | A1 | | 2/2019 | Hoekstra |
| 2022/0050084 | A1 | * | 2/2022 | Panzer ................. G01N 29/262 |

OTHER PUBLICATIONS

Hall et al., "Micromachined Accelerometers With Optical Interferometric Read-Out and Integrated Electrostatic Actuation", J Microelectromech Syst., Feb. 2008, vol. 17, No. 1, pp. 37-44.

Robinson et al., "Development of MEMS Photoacoustic Spectroscopy", Sandia National Laboratories, Jan. 2014, 88 pages.

International Search Report and Written Opinion in corresponding International Application No. PCT/EP2020/059392 dated Jun. 19, 2020, 9 pages.

Chinese Office Action dated Oct. 26, 2023, issued in Chinese Patent Application No. 202080037400.3, with English translation, 12 pages.

\* cited by examiner

OPTICAL TRANSDUCER AND METHOD FOR MEASURING DISPLACEMENT

CROSS-REFERENCE TO RELATED APPLICATIONS

The present application is the national stage entry of International Patent Application No. PCT/EP2020/059392, filed on Apr. 2, 2020, and published as WO 2020/233882 A1 on Nov. 26, 2020, which claims the benefit of priority of European Patent Application No. 19175935.6, filed on May 22, 2019, all of which are incorporated by reference herein in their entirety.

This disclosure is related to an optical transducer for measuring displacement of a diaphragm and to a method for measuring said displacement.

Micro-electro-mechanical system, MEMS, transducers for sensing dynamic pressure changes are used in a wide range of transducers in modern consumer electronics, in particular as microphones for sensing pressure waves in the acoustic frequency band. Common examples in which highly integrated MEMS microphones play an important role are portable computing devices such as laptops, notebooks and tablet computers, but also portable communication devices like smartphones or smart watches. While modern transducers commonly rely on a capacitive readout, which is sufficient, for example, for high-end audio applications, newly emerging applications such as voice recognition and deep learning applications require an increased signal-to-noise ratio beyond the capabilities of present capacitive transducers.

An object to be achieved is to provide an improved concept for a high sensitivity, low noise transducer.

This object is achieved with the subject-matter of the independent claims. Embodiments and developments of the improved concept are defined in the dependent claims.

The improved concept is based on the idea of providing an integrated optical transducer that relies on interferometric readout of a displacement of a mechanically compliant object, such as a diaphragm, that is being influenced by dynamic pressure changes. Moreover, the improved concept realizes a high sensitivity measurement of the displacement by ensuring a high efficiency and minimal loss of the optical readout scheme.

In particular, an optical transducer for measuring displacement of a diaphragm according to the improved concept comprises the diaphragm, a lens element and a substrate body having a waveguide structure and a coupling element. The diaphragm is arranged distant from the substrate body and parallel or substantially parallel to a main extension plane of the substrate body. The waveguide structure is configured to guide light from a light source to the coupling element and from the coupling element to a photodetector. The coupling element is configured to couple at least part of the light in the waveguide onto a light path between the coupling element and the diaphragm and to couple light reflected by a surface of the diaphragm from the light path into the waveguide structure. The lens element is arranged on the light path such that light on the light path passes through the lens element.

For example, an optical transducer according to the improved concept comprises a MEMS die having a MEMS diaphragm with an outer side that is exposed to dynamic pressure changes that induce the displacement of the diaphragm. The MEMS diaphragm is, for example, a suspended membrane made of a material such as silicon nitride, crystalline silicon or polysilicon. The suppression is, for example, realized by means of a clamping structure made of a material such as silicon. For being exposed to the dynamic pressure changes, the outer side of the diaphragm is facing an environment of the optical transducer. Consequently, an inner side of the diaphragm faces the substrate body.

The substrate body is, for example, a second die that is fabricated separately from the MEMS die and may comprise active circuitry of an ASIC arranged on a substrate, such as a silicon substrate. The substrate body further comprises optical elements necessary to realize the interferometric readout of the displacement of the MEMS diaphragm. The elements include the waveguide structure and a coupling element that, for example, is a beam splitter for the splitting and combining of optical beams. Optionally, the substrate body further comprises the photodetector, such as a silicon photodiode, for optical analysis and generation of an electronic interference signal.

For forming the optical transducer the diaphragm and the substrate body are arranged with respect to each other such that a cavity is created in between the diaphragm and the substrate body, wherein the cavity is characterized by a gap with a certain gap height. For example, the MEMS die and the substrate body are bonded together, for example following conventional wafer bonding techniques which may be of an adhesive or of a eutectic type.

The diaphragm, the waveguide structure and the coupling element form an optical interferometer, such as a Mach-Zehnder or a Michelson interferometer, which relies on the coupling element splitting and directing part of the light inside the waveguide structure as a probe beam onto the light path towards a surface of the diaphragm, e.g. a point or a surface on the inner side. For example, the diaphragm is of a reflective material or has a reflective target such as a reflective coating. In particular, the diaphragm is free from an optical grating, i.e. the diaphragm is free from patterns, perforations, structures and the like. Moreover, the interferometer does not comprise a back plate, such as a perforated back plate having a grating or a reflective back plate, that is arranged either between the coupling element and the diaphragm or distant from the side of the diaphragm facing away from the substrate body.

After impinging on and being reflected by said surface, the probe beam is directed on the light path back to the coupling element and is recombined with the remaining light in the waveguide structure, i.e. the portion of the light that was not coupled onto the light path, that may be referred to as a reference beam. The interference signal is created by a length change of the light path of the probe beam, which is for example caused by a displacement of the diaphragm induced by vibrations from dynamic pressure changes. This causes a phase shift of the probe beam with respect to the reference beam. The resulting phase difference causes the interference signal in the recombined beam, the so-called superposition beam, which may be detected and analyzed by means of the photodetector, providing information about the displacement of the diaphragm.

The coupling element is, for example, a grating coupler, such as a Bragg grating coupler. Typically, light coupled from a waveguide structure into free space using such a coupling element is characterized by a significant beam divergence. This beam divergence, if not corrected for, leads to a significant portion of light being coupled from the waveguide structure at an angle with respect to the light path such that it does not impinge on the coupling element after being reflected by the diaphragm. In other words, the beam divergence leads to significant optical losses in the interferometric readout scheme, hence causing a deteriorated sensitivity of the displacement measurement.

In order to overcome this limitation, the lens element is employed in the light path in order to account for the divergence and to ensure a high efficiency, i.e. negligible optical losses, of the interferometer. For example, the lens element is a single material forming a length such as a double convex, plano-convex or a Fresnel lens. A material of the lens element is a transparent material such as an oxide or a glass, for instance. In this context, the transparency of the material refers to the transparency at a wavelength of the light source. For example, the light source is a laser light source operating at a near infrared wavelength, such as 980 nm.

In some embodiments, the lens element is configured to collimate the light from the coupling element on the light path passing through the lens element and to focus the light from the diaphragm on the light path passing through the lens element.

The lens element in such embodiments corrects for the divergence by collimating the light on the light path that passes the lens element from the coupling element. After it is reflected by the diaphragm and passes the lens element a second time, the light is focused towards the coupling element in a manner corresponding to the initial divergence. The collimation has the advantage that the light between the lens element and the diaphragm propagates parallel to the light path. Furthermore, after reflection substantially all light from the diaphragm is again captured by the lens element and focused such that substantially all light on the light path is coupled back into the waveguide structure by means of the coupling element. In other words, as the lens element collimates the light on the light path received from the coupling element, the likewise collimated light received from the diaphragm after reflection is mode matched for efficient coupling back into the waveguide structure.

In some embodiments, the lens element is configured to compensate a divergence of the light on the light path received from the coupling element.

Compensating the beam divergence in this sense means that the divergence is being reversed. For example, the lens element collimates divergent light. Correspondingly, the lens element focuses collimated light in a manner corresponding to a certain divergence.

In some embodiments, the lens element is arranged perpendicular to the light path and a diameter of the lens element substantially corresponds to a beam diameter of the light on the light path at a position of the lens element.

These embodiments ensure both capturing substantially all light on the light path and efficiently collimating divergent light and focusing collimated light across the entire beam diameter. Choosing a diameter of the lens element to correspond to that of the beam of the light at the position of the lens element further ensures that the lens element is properly dimensioned, thus not wasting any material by providing a lens with a too large diameter. A placement closer to the coupling element for a given divergence therefore means a smaller required diameter of the lens element.

In some embodiments, the lens element is arranged on the surface of the diaphragm.

In order to avoid any additional support structures for arranging the lens element on the light path, the lens element in these embodiments is arranged on the surface, i.e. the inner surface, of the diaphragm or on a reflective target of the diaphragm. For example, the lens element is a deposited, patterned and structured oxide layer, such as a silicon dioxide layer, on the inner surface of the diaphragm.

In some embodiments, the lens element is arranged on a transparent spacer body arranged between the coupling element and the diaphragm.

The lens element may be arranged anywhere between the coupling element and the diaphragm. For this arrangement, a transparent spacer body may be arranged on a surface of the substrate body or of the diaphragm. The lens element is then arranged on a surface of the spacer body. Alternatively, the lens element is comprised by the spacer body, for example as a structured surface of the spacer body. The spacer body may be transparent with respect to a wavelength of the light source and may be of a material such as an oxide.

In some embodiments, the lens element is arranged on a surface of the coupling element.

As mentioned above, the beam diameter coupled onto the light path due to its divergence is the smallest at the position of the coupling element. Therefore, a lens element arranged on a surface of the coupling element may be smaller compared to a lens element that is arranged distant from the coupling element on the light path while still being able to capture all light coupled onto the light path.

In some embodiments, the light path is substantially perpendicular to the main extension plane of the substrate body and/or to the surface of the diaphragm.

As the displacement of a diaphragm typically is maximal in a perpendicular direction with respect to its main plane of extension, orienting the light path in a corresponding manner has the advantage that a displacement of the diaphragm can be probed with maximal sensitivity. Likewise, perpendicular reflection by the diaphragm means that the light path before and after reflection of the surface of the diaphragm correspond to each other such that the same optical elements, such as the lens element, can be used for both directions of propagation. As the diaphragm is arranged parallel to the main plane of extension of the substrate body, arranging the light path perpendicular to the diaphragm is tantamount to arranging the light path also perpendicular to the substrate body.

In some embodiments, the coupling element is configured to couple the light from the waveguide structure onto the light path with a divergence that corresponds to a numerical aperture of the lens element.

Synchronizing the divergence of the coupling element with the numerical aperture of the lens element, characterizing its range of angles over which the lens element can accept light, means that the divergence of the coupling element can be sufficiently accounted for, e.g. in terms of collimation and/or focusing. For example, the coupling element can be engineered by adjusting an impedance of the waveguide structure with respect to that of free space. Alternatively or in addition, the divergence may be controlled by means of a degree of confinement of light within the waveguide structure. This confinement is determined by a contrast, i.e. dimensions and/or materials, between a core and a cladding of the waveguide structure. A low contrast means a low degree of confinement and a significant evanescent wave. A high contrast means a high degree of confinement and hence a low evanescent wave. A large confinement of the waveguide leads to a large mismatch of the impedance between the waveguide structure and free space, leading to a larger divergence compared to a waveguide structure with low confinement for a given grating coupling element.

In some embodiments, the substrate body further comprises the light source and/or the photodetector.

The light source may be a coherent light source such as a laser. On-chip solutions include integrated semiconductor lasers such as vertical cavity surface emitting lasers, VCSEL. These lasers may have small enough dimensions in order to be included in an application-specific integrated circuit that may be comprised by the substrate body of the optical transducer for supplying the source beam. If the substrate body further comprises the photodetector, such as a silicon photodiode, the optical transducer is able to operate independently without the requirement of an external light source or an external photodetector.

In some embodiments, a wavelength of the light source is adjustable.

As described above, the diaphragm and the substrate body form two ends of a cavity with the light path corresponding to the axis of the cavity. Actual dimensions of the sensor, however, may deviate from design dimensions due to imperfections or tolerances during the fabrication process. For example, the cavity length may vary by up to 5 μm and therefore end up smaller or larger than the design length. To first order, the property of the interferometer compensates for any variation of the cavity length. In addition, tuning of the wavelength of the light source helps to achieve an operation of the interferometer in a high gain region, at which maximal sensitivity of the displacement measurement of the diaphragm is achieved.

In some embodiments, the waveguide structure, the coupling element and the diaphragm form an interferometer, in particular an imbalanced interferometer.

The diaphragm, i.e. a reflective target of the diaphragm, and the coupling element form a cavity wherein the optical axis of the cavity corresponds to the light path. The coupling element acts as a beam splitter in a Michelson or Mach Zehnder style interferometer, wherein the probe beam is the portion of the light that is split by the coupling element, i.e. coupled onto the light path, and probes the diaphragm by reflection. After reflection, the light is combined with the reference beam by the coupling element in order to form a combined superposition beam. Compared to conventional optical probing that is based on simple reflection of a light beam at an angle of incidence and tracking the location at which the reflected beam hits a (segmented) photodetector, an interferometric readout provides sensitivities that are several orders of magnitude larger.

In some embodiments, a wavelength of the light source is adjustable and is set such that a specific predetermined operating point of the interferometer is achieved.

In order to reach maximum sensitivity, the interferometer can be specifically operated in a high gain regime. To this end, a probe wavelength of the light source may be tuned to achieve a certain mean phase difference between the reference and the probe beams. For example, the light source may be tuned such that the probe wavelength is a resonance wavelength of the cavity.

The object is further solved by an electronic device, such as an audio device or a communication device, comprising an optical transducer according to one of the embodiments described above. The optical transducer is employed as an optical displacement sensor that is configured to detect pressure changes, in particular dynamic pressure changes at rates corresponding to audio frequencies.

The object is further solved by a method for measuring displacement of a diaphragm. The method comprises providing a waveguide for guiding light from a light source to a coupling element and from the coupling element to a photodiode. The method further comprises coupling by means of the coupling element at least part of the light in the waveguide onto a light path between the coupling element and the diaphragm, and coupling by means of the coupling element light reflected by a surface of the diaphragm from the light path into the waveguide structure. The method further comprises arranging a lens element on the light path such that light on the light path passes through the lens element, and generating an electronic signal depending on light received by the photodiode.

Further embodiments of the method become apparent to the skilled reader from the embodiments of the optical transducer described above.

The following description of figures of example embodiments may further illustrate and explain aspects of the improved concept. Components and parts of the optical transducer with the same structure and the same effect, respectively, appear with equivalent reference symbols. Insofar as components and parts of the sensor correspond to one another in terms of their function in different figures, the description thereof is not repeated for each of the following figures.

Figure 1:
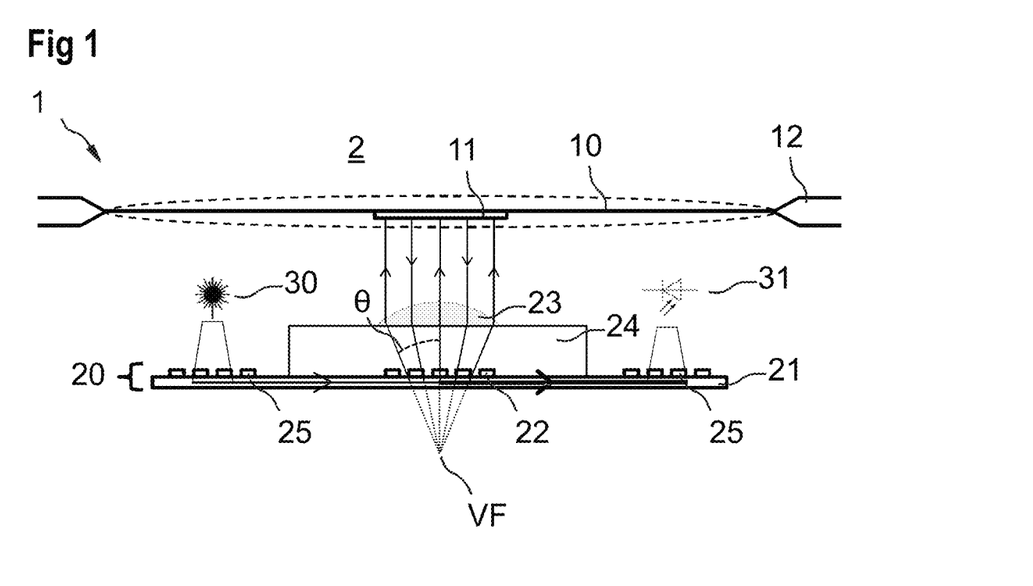
FIG. 1 shows a cross section view of an embodiment of the integrated optical transducer according to the improved concept.

FIG. 1 shows a cross section view of an embodiment of the integrated optical transducer 1 according to the improved concept. The transducer 1 comprises a MEMS diaphragm 10 and a substrate body 20. The MEMS diaphragm 10 may be part of a MEMS die that is for example in fused contact with the substrate body 20, which may be an ASIC die, after separate manufacturing processes. The fused contact is realized via standard wafer bonding techniques for instance. The diaphragm 10 and the substrate body 20 may be the only dies of the integrated optical transducer 1.

The MEMS diaphragm 10 is for example a suspended membrane made of a crystalline or polycrystalline material such as silicon or poly-silicon, a dielectric, or a metal. A typical diameter for a diaphragm 10 configured to be sensitive to sound waves is in the order of 0.25 mm to 1.5 mm. The diaphragm 10 comprises a first side which is exposed to dynamic pressure changes such as acoustic waves in an environment 2 of the transducer 1. The diaphragm 10 further comprises a second side that faces the substrate body 20. On this second side, which may be referred to as the inner side, a reflective target 11 is arranged. Reflective in this sense means that the reflective target 11 is reflective for light of a certain probe wavelength. The reflective target 11 is for example realized by a coating of a reflective material, such as a metal. Alternatively, the diaphragm 10 may be of a reflective material such that the inner surface itself is reflective.

The suspension of the diaphragm 10 is realized through a suspension structure 12 which clamps the diaphragm 10 and may be made of a single material, e.g. a substrate material of a MEMS die such as silicon, or may comprise more than one material. The suspension structure 12 may further act as a bonding structure for bonding the MEMS die to the substrate body 20.

The diaphragm 10 is arranged distant from and parallel or substantially parallel, i.e. an angle between the diaphragm 10 and the substrate body 20 is less than 5°, to the substrate body 20 in such a fashion that an optical cavity is formed, which is delineated by the reflective target 11 of the diaphragm 10 and the substrate body 20. The gap formed between the substrate body 20 and the diaphragm 10 is equal to or larger than 100 μm, in particular equal to or larger than 200 μm. Moreover, the transducer, in particular the cavity, is free from a perforated back plate commonly found in conventional transducers. The optical axis of the cavity is referred to as the light path.

The substrate body 20 comprises for example an application-specific integrated circuit, ASIC, which is configured to detect a deflection of the diaphragm 10, for example a periodical deflection due to an oscillation of the diaphragm 10, which is indicated as dashed lines in the FIG. 1. To this end, the substrate body 20 comprises optical elements including a waveguide structure 21 and a coupling element 22. The ASIC die 20 may further comprise a coherent light source 30, for example a VCSEL with a probe wavelength of 980 nm. Alternatively, the waveguide structure is configured to receive light from an external, i.e. a separate, light source.

The waveguide structure 21 is configured to confine light and guide it from the light source 30 to the coupling element 22. The coupling element 22 is configured to split and direct part of the light inside the waveguide structure 21 as a probe beam onto the light path towards the reflective target 11 of the diaphragm 10. After impinging on and being reflected by the reflective target 11, the probe beam is directed on the light path back to the coupling element 22 and is recombined with the remaining light in the waveguide structure 20, i.e. the portion of the light that was not coupled onto the light path, that may be referred to as a reference beam.

Having both a large sensitivity of a displacement measurement and a high efficiency, meaning low light losses, employing a measurement setup using a single coupling element 22 requires that substantially all light coupled from the waveguide structure 21 onto the light path impinges on the reflective target 11 in a perpendicular manner. The coupling element 22 is, for example, a grating coupler, such as a Bragg grating coupler. The light coupled from a waveguide structure into free space using such a coupling element is characterized by a non-negligible beam divergence. This beam divergence, if not corrected for, leads to a significant portion of light being coupled from the waveguide structure 21 as a light cone with an angle θ with respect to the light path. In this example, a typical value of θ is in the order of 10°. This may result in a substantial portion of the light not impinging on the reflective target 11 and thus being lost. Moreover, as the divergence propagates, not all light that is reflected by the reflective target 11 is impinging back on the coupling element 22.

To overcome the described losses induced by divergence, a lens element 23 is arranged on the light path between the reflective target 11 and the coupling element 22. In this embodiment, the lens element is arranged on a spacer 24. The spacer 24 is transparent with respect to the probe wavelength. For example, the spacer 24 is a layer of a transparent material such as an oxide that is arranged on a surface of the substrate body 20 facing the diaphragm 10. A thickness of the spacer measured in the direction of the light path may be in the order of a few micrometer. On a surface of the spacer 24 that is facing the diaphragm 10, the lens element 23 is arranged, which in this embodiment is a plano-convex lens. The lens element 23 is likewise of a transparent material such as an oxide or a glass. The material of the lens element 23 may be the same as the material of the spacer 24. The lens element 23 is arranged and configured to capture all light coupled from the coupling element 20 into the cavity.

The lens element 23 is further configured to compensate for a divergence angle θ of the coupling element 22. In other words, the lens element 23 collimates the light received from the coupling element 22. To this end, a focal point of the lens element 23 corresponds to a virtual focal point VF of the coupling element 22, wherein the virtual focal point VF may be located distant from the substrate body 20 in a direction opposing the diaphragm 10 as indicated in FIG. 1. Moreover, a diameter of the lens element 23 corresponds substantially to the beam diameter of the light, i.e. the diameter of the light cone, on the light path at the location of the lens element 23.

The collimated light impinges on the reflective target 11, which likewise corresponds in its diameter to that of the collimated light beam on the light path, and is reflected in the same perpendicular manner away from the diaphragm 10. On this return path, the lens element 23 focusses the light with a focal length corresponding to that described by the virtual focal point VF of the coupling element 22 such that substantially all light on the light path after reflection by the reflective target 11 is efficiently coupled back into the waveguide structure 21. It is emphasized that a deflection of the diaphragm 10 is typically several orders of magnitude smaller than the cavity length such that perpendicular impinging is given for any deflection of the diaphragm 10.

The substrate body 20 may also comprise further coupling elements 25 for coupling light from the light source 30 into the waveguide structure 21, and from the waveguide structure 21 to a photodetector 31, for instance. The light source 30 and the photodetector 31, which may be a photodiode, are comprised by the substrate body 20, for instance.

The photodetector 31 is configured to generate an electronic interference signal that is created by a length change of the light path of the probe beam, which is in particular caused by a displacement of the diaphragm 10 induced by vibrations from dynamic pressure changes in the environment 2. The electronic interference signal hence provides information about the displacement of the diaphragm 10.

The total path length, i.e. the optical path length from the light source 30 to the photodetector 31, of the light that impinges on the diaphragm 10 differs from the path length of the light that is not coupled onto the light path by substantially twice the cavity length. Therefore, the transducer realizes an unbalanced interferometer, in particular an unbalanced Michelson or Mach-Zehnder style interferometer. In order to operate in a desirable high-gain region of the interferometer, i.e. at a certain mean phase difference between the path length of the reference beam and that of the probe beam, the light source 31 may be tunable in order to adjust the probe wavelength accordingly. For example, the light source 31 is a VCSEL that is tunable via a bias voltage.

Figure 2:
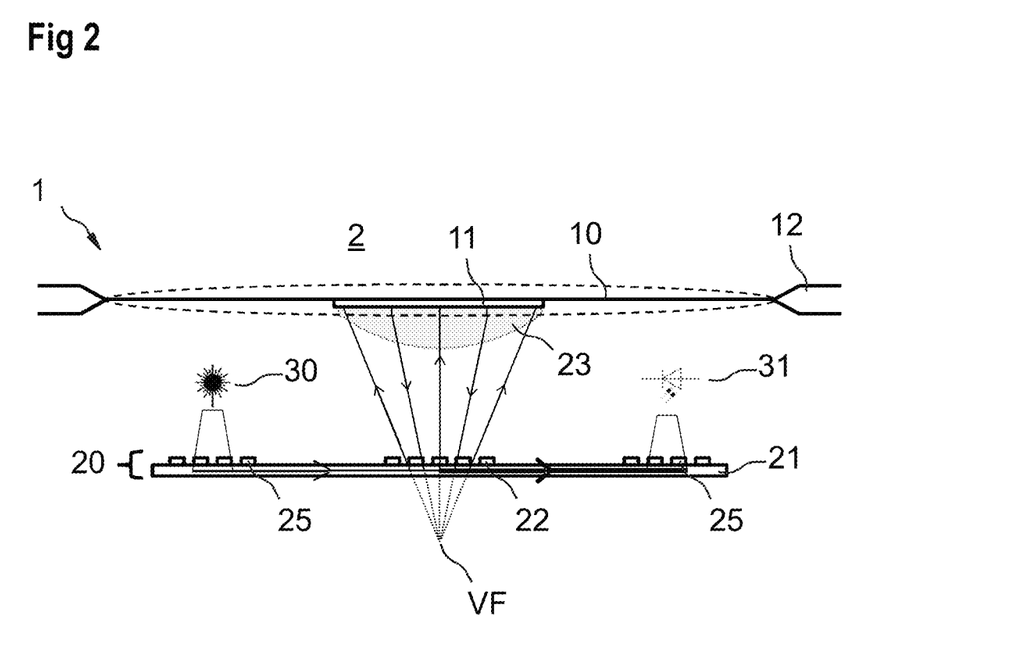
FIG. 2 shows a cross section view of a further embodiment of the integrated optical transducer.

FIG. 2 shows a cross section view of an embodiment of the integrated optical transducer that is based on the embodiment of FIG. 1. In this embodiment, the lens element 23 is arranged on the surface of the reflective target 11. For a given gap, i.e. cavity length, between the substrate body 20 and the diaphragm 10 and for a given divergence angle θ of the coupling element 22, the diameters of both the reflective target 11 and the lens element 23 are required to be adjusted in dependence of the distance between the lens element 23 and the coupling element 22. Compared to the embodiment shown in FIG. 1, both the lens element 23 and the reflective target 11 have a larger diameter if the lens element 23 is arranged on the surface of the reflective target 11, i.e. arranged at a larger distance from the coupling element 22.

An advantage of this embodiment may be the lack of the spacer 24, keeping the fabrication process at a simpler level and the bill of materials as short as possible. Moreover, as illustrated in the FIG. 2, this embodiment requires a lens element 23 with a larger focal length compared to that of FIG. 1, which may further enhance the efficiency of the lens element 23, e.g. due to a larger aperture.

In an alternative embodiment not shown, the same lens element 23 and same reflective target 11 as in FIG. 1 could be employed, wherein, like in FIG. 2, the lens element 23 is arranged on a surface of the reflective target 11. In such an embodiment, a lower divergence θ is required such that also in this case substantially all light is captured by the lens element 23. For a given coupling element 22, the divergence θ may be adjusted by engineering a corresponding degree of light confinement for the waveguide structure 21. If the waveguide structure 21 has a large degree of confinement, as the light is coupled onto the light path there is a large mismatch between the waveguide structure 21 and free space which is tantamount to a large divergence θ. In contrast, a low degree of confinement of the waveguide structure 21 means a small divergence of light.

Therefore, for a given coupling element 22 and lens element 23, with the latter being mounted on a spacer 24, such as a photonic wafer, the waveguide structure 21 may have a large degree of confinement, such that the divergence likewise is large and all light is still captured by the lens element 23. In contrast, if said lens element 23 is arranged on a surface of the reflective target 11, i.e. it is arranged at a larger distance from the coupling element 22, the waveguide structure 21 is required to have a small degree of confinement in order to ensure a small divergence such that still all light is captured by the lens elements 23.

Figure 3:
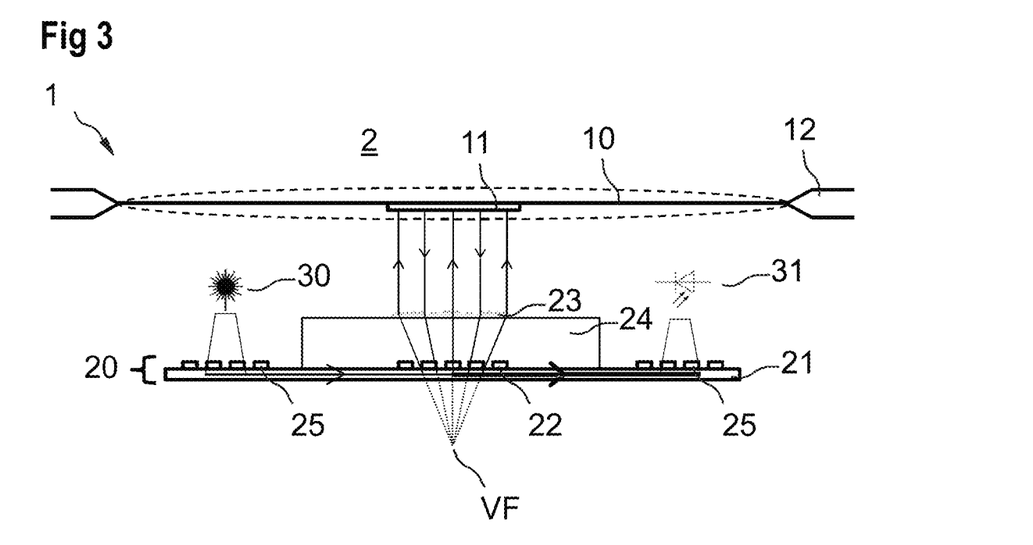
FIG. 3 shows a cross section view of a further embodiment of the integrated optical transducer.

FIG. 3 shows a cross section view of an embodiment of the integrated optical transducer that is based on the embodiment of FIG. 1. In this embodiment, the lens element 23 is a Fresnel lens. A Fresnel lens is a type of compact lens with a design that allows a large aperture and short focal length similar to that of a conventional lens, such as a common plano-convex lens, with the advantage that significantly less volume and mass is required to form the lens element 23, hence saving a significant amount of lens material.

Figure 4:
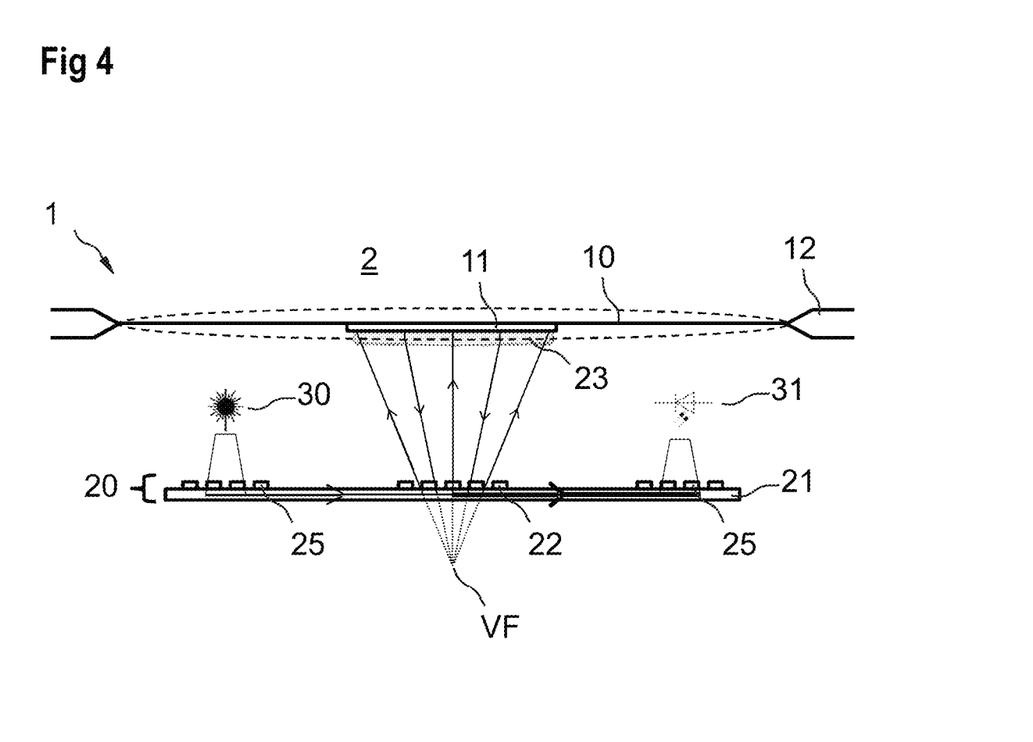
FIG. 4 shows a cross section view of a further embodiment of the integrated optical transducer.

FIG. 4 shows a cross-sectional view of an embodiment of the integrated optical transducer that is based on the embodiment of the previous FIGS. 1 to 3. Similar to the embodiment shown in FIG. 2, the lens element 23 in this embodiment is likewise arranged on a surface of the reflective target 11 of the diaphragm 10. In this embodiment, the lens element 23 is a micro-Fresnel lens. Compared to the embodiment shown in FIG. 3, this type of lens requires even less volume and mass, hence constituting an even more efficient way of providing the lens element 23. A micro-Fresnel lens may be formed by means of laser beam lithography on the surface of the reflective target 11, therefore constituting a straightforward process to form the lens element 23.

Figure 5:
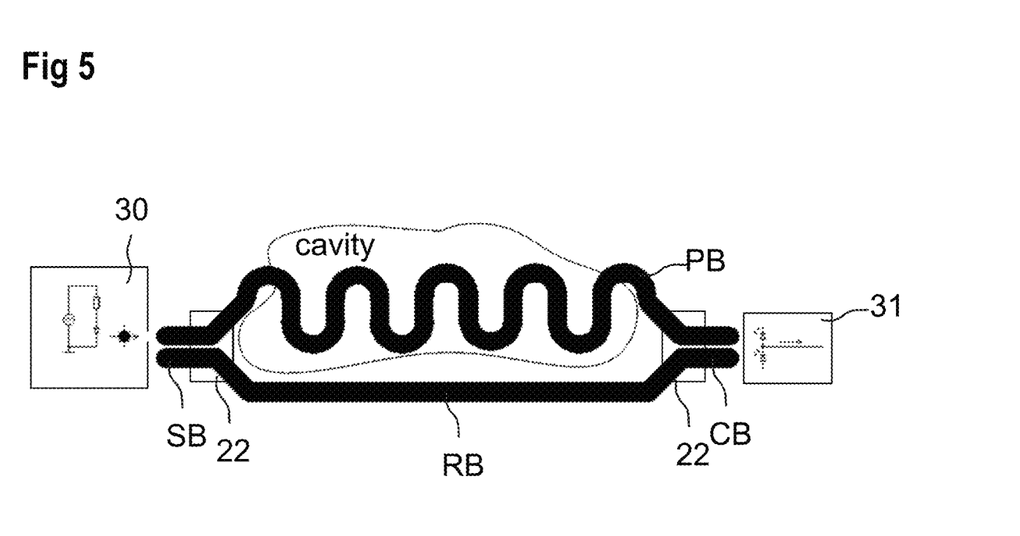
FIG. 5 illustrates the working principle of an unbalanced interferometer employed in the embodiments of the integrated optical transducers.

FIG. 5 illustrates the working principle of an unbalanced interferometer employed in the embodiments of the integrated optical transducers shown in FIGS. 1 to 4. A source beam SB, which is in particular laser light at a probe wavelength, is emitted by the light source 30 and guided via the waveguide structure 21 to the coupling element 22. Here the light is split into a reference beam RB and a probe beam PB. As described above the reference beam RB remains within the waveguide structure 21, while the probe beam PB is coupled onto the light path in the cavity. For example, the coupling element 22 splits with a 50-50 ratio. After interacting with the reflective target 11 of the diaphragm 10, the probe beam PB is directed back to the coupling element 22, where it is coupled into the waveguide structure 21 and hence recombined with the reference beam RB, and together with the latter as a combined superposition beam CB directed to the photodetector 31 where the interference signal is generated based on the photocurrent that is created by the detected superposition beam CB.

The figure emphasizes and may exaggerate the imbalance between the reference beam RB and the probe beam PB, however, the difference in the path length may be in the order of or smaller than the coherence length of the light source 30. The light source 30 in the figure comprises an electric circuit for providing a control voltage that adjusts the probe wavelength in order for the interferometer to operate in a desired high gain regime. For example, the probe wavelength is tuned to a resonance wavelength of the cavity.

The embodiments shown in the FIGS. 1 to 4 as stated represent exemplary embodiments of the integrated optical transducer 1, therefore they do not constitute a complete list of all embodiments according to the improved concept. Actual transducer configurations may vary from the embodiments shown in terms of shape, size and materials, for example.

A transducer 1 according to one of the embodiments shown may be conveniently employed in various applications that require a compact high-sensitivity transducer for detecting small dynamic pressure changes, particularly in the audio band for the detection of sound waves. Possible applications include an employment as an acoustic microphone for voice recognition and deep learning purposes in computing devices such as laptops, notebooks and tablet computers, but also in portable communication devices like smartphones and smart watches, headphones and earphones in which space for additional components is extremely limited.

REFERENCE NUMERALS 1 integrated optical transducer
2 environment
10 diaphragm
11 reflective target
12 suspension structure
12 first side
20 substrate body
21 waveguide structure
22 coupling element
23 lens element
24 spacer
25 further coupling element
30 light source
31 photodetector
CB superposition beam
PB probe beam
RB reference beam
SB source beam
VF virtual focal point

The invention claimed is:
1. An integrated optical transducer for measuring displacement of a diaphragm, the optical transducer comprising the diaphragm, a lens element and a substrate body having a waveguide structure and a coupling element, wherein the diaphragm is arranged distant from the substrate body;

the diaphragm is arranged parallel or substantially parallel to a main extension plane of the substrate body;

the waveguide structure is configured to guide light from a light source to the coupling element and from the coupling element to a photodetector;

the coupling element is configured as a beam splitter in order to couple at least part of the light in the waveguide structure as a probe beam onto a light path between the coupling element and the diaphragm, wherein remaining light in the waveguide structure forms a reference beam;

the coupling element is further configured to couple light of the probe beam reflected by a surface of the diaphragm from the light path into the waveguide structure where it is recombined with the reference beam in order to form a combined superposition beam that is directed to the photodetector; and the lens element is arranged on the light path such that light on the light path passes through the lens element.

2. The optical transducer according to claim 1, wherein the lens element is configured to collimate the light from the coupling element on the light path passing through the lens element; and focus the light from the diaphragm on the light path passing through the lens element.

3. The optical transducer according to claim 1, wherein the lens element is configured to compensate a divergence of the light on the light path received from the coupling element.

4. The optical transducer according to claim 1, wherein the lens element is arranged perpendicular to the light path and a diameter of the lens element substantially corresponds to a beam diameter of the light on the light path at a position of the lens element.

5. The optical transducer according to claim 1, wherein the lens element is arranged on the surface of the diaphragm.

6. The optical transducer according to claim 1, wherein the lens element is arranged on a transparent spacer arranged between the coupling element and the diaphragm.

7. The optical transducer according to claim 1, wherein the lens element is arranged on a surface of the coupling element.

8. The optical transducer according to claim 1, wherein the light path is substantially perpendicular to the main extension plane of the substrate body and/or to the surface of the diaphragm.

9. The optical transducer according to claim 1, wherein the coupling element is configured to couple the light from the waveguide structure onto the light path with a divergence corresponding to a numerical aperture of the lens element.

10. The optical transducer according to claim 1, wherein the substrate body further comprises the light source and/or the photodetector.

11. The optical transducer according to claim 1, wherein a wavelength of the light source is adjustable.

12. The optical transducer according to claim 1, wherein the waveguide structure, the coupling element and the diaphragm form an interferometer.

13. The optical transducer according to claim 12, wherein a wavelength of the light source is adjustable and is set such that a specific predetermined operating regime of the interferometer is achieved.

14. An electronic device comprising an optical transducer according to claim 1, wherein the optical transducer is employed as an optical displacement sensor that is configured to detect pressure changes.

15. A method for measuring displacement of a diaphragm, the method comprising:

providing a waveguide structure for guiding light from a light source to a coupling element that is configured as a beam splitter and from the coupling element to a photodetector;

coupling by means of the coupling element at least part of the light in the waveguide structure as a probe beam onto a light path between the coupling element and the diaphragm wherein remaining light in the waveguide structure forms a reference beam;

coupling by means of the coupling element light of the probe beam reflected by a surface of the diaphragm from the light path into the waveguide structure where it is recombined with the reference beam in order to form a combined superposition beam that is directed to the photodetector;

arranging a lens element on the light path such that light on the light path passes through the lens element; and generating an electronic signal depending on light received by the photodetector.

16. The optical transducer according to claim 1, wherein the waveguide structure, the coupling element and the diaphragm form an imbalanced interferometer.

17. The electronic device according to claim 14, wherein the optical transducer is configured to detect dynamic pressure changes at rates corresponding to audio frequencies.

18. The electronic device according to claim 14, wherein the electronic device is an audio device or a communication device.

* * * * *